Oct. 28, 1952        J. J. BLACK        2,615,751
EXTRUDED FLOOR SECTION FOR REFRIGERATOR VEHICLES
Filed April 14, 1950        3 Sheets-Sheet 2

INVENTOR.
James J. Black
BY
Wood, Arey, Herron & Evans
ATTORNEYS.

Oct. 28, 1952  J. J. BLACK  2,615,751
EXTRUDED FLOOR SECTION FOR REFRIGERATOR VEHICLES
Filed April 14, 1950  3 Sheets-Sheet 3
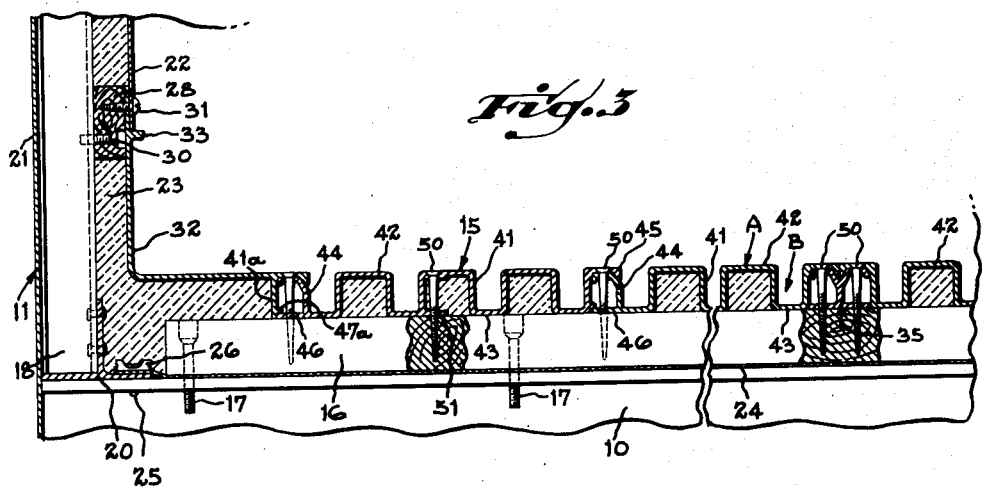
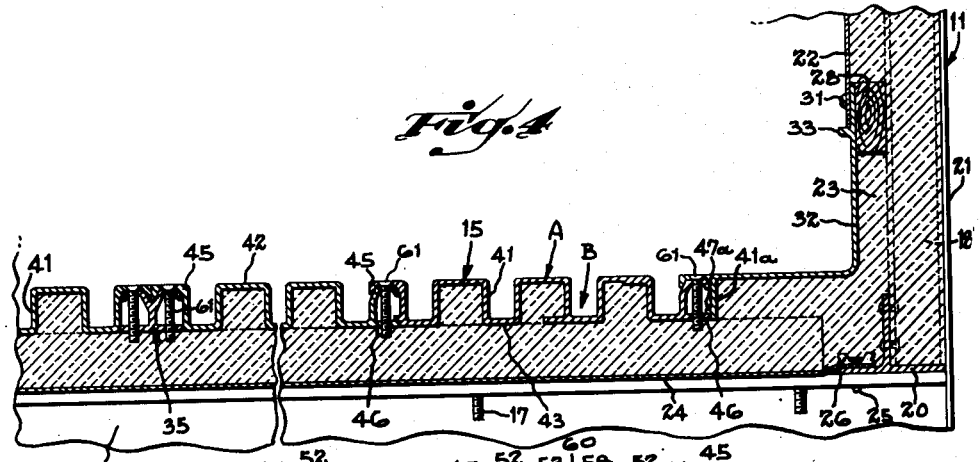
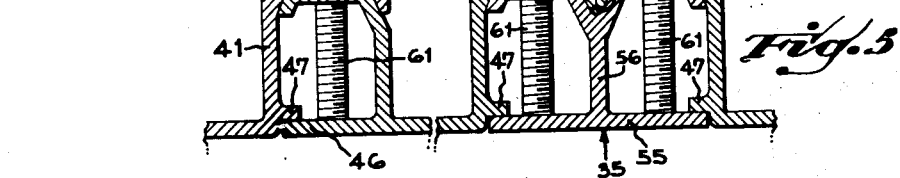
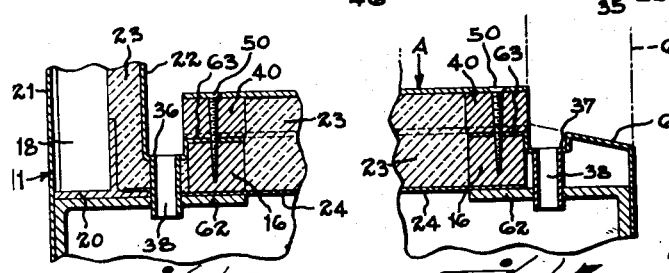
INVENTOR.
James J. Black
BY
Wood, Arey, Herron & Evans
ATTORNEYS.

Patented Oct. 28, 1952

2,615,751

UNITED STATES PATENT OFFICE 2,615,751

EXTRUDED FLOOR SECTION FOR REFRIGERATOR VEHICLES

James J. Black, Cincinnati, Ohio, assignor, by mesne assignments, to Trailmobile Inc., a corporation of Delaware Application April 14, 1950, Serial No. 155,863

10 Claims. (Cl. 296—28)

This invention relates to the floor construction of insulated refrigerator trailers and similar vehicles and has particular reference to a structure which is assembled from extruded metal sections, providing a lightweight, water-proof floor of exceptional strength and durability.

In refrigerator trailers used in the transportation of perishable merchandise, such as foods which require refrigeration, it is necessary to maintain a circulation of air within the vehicle, especially beneath the cargo resting upon the floor in order to keep the entire cargo at a uniformly low temperature. Also, in many instances, the trailer is packed with ice which requires that some provision be made for draining from the vehicle the water which is formed by the melting ice and by condensation. For insulating purposes, the walls and floors are of double construction with insulating material such as mineral wool packed between them to prevent heat loss. The insulating material must be kept dry in order to retain its insulating capacity; therefore, the walls and floor are made water-proof. This not only protects the insulation but also prevents corrosion of the frame structure which supports the walls and floors.

In the past, it has been the practice to install upon the floor a series of wood strips, commonly called duct strips which space the cargo from the floor and delineate channels to drain off water from the melting ice and to circulate air beneath the cargo. Floors of this construction serve their purpose reasonably well but they are heavy due to the amount of material employed and the presence of water and rough treatment cause the duct strips to deteriorate rapidly. Moreover, they are apt to leak water and damage the insulating material packed beneath them because it is extremely difficult to maintain water-proof joints between the floor sections whether they be of wood or metal. This is due to the working loose of the sections with respect to one another under heavy loads and shocks encountered when the vehicle is running.

The principal object of the present invention has been to eliminate the above problems by the provision of a floor which is assembled from relatively thin walled metal extrusions of corrugated cross section, providing alternate channels and cargo support surfaces and arranged to form a water-tight floor which is light in weight but exceptionally strong and durable. The extrusions are formed preferably from light metal such as aluminum and are laid in courses, each being provided along opposite edges with a tongue and groove providing an interlocking joint when the sections are applied in side-by-side relationship upon the framework of the trailer. The joint so provided retains a water sealing compound upon its meeting surfaces and the assembled extrusions present a continuous water-proof surface having grooves extending longitudinally for water drainage and air circulation.

In order to provide a sealed connection between the floor and side walls of the trailer, a right angular base extrusion is applied at the juncture between the floor and walls. The base section carries the sealed floor partially up the wall as a continuation and is constructed and arranged to interlock with the edge of the adjoining floor extrusion and establish a watertight connection between the floor and walls. Since the edges of the extrusions provide alternate tongues and grooves, a reversing section is provided by means of which the relationship of the floor extrusions is reversed at an intermediate point longitudinally of the floor. By this arrangement, the tongue edge of the extrusion is joined to the angular base section along one side wall of the body and the floor extrusions are continued in this relationship to the reversing section. At the reversing section, the relationship of the floor extrusions is continued in reverse order such that the tongue section also is presented to the base section at the opposite side wall of the vehicle, thereby producing a floor structure employing duplicate base extrusions for both walls of the vehicle which may be made from a single die.

The extruded flooring is supported by bolsters which are located at spaced intervals crosswise of the trailer frame with the interlocked extrusions extending longitudinally of the frame and secured by screws to the bolsters. The mastic water-proofing compound is applied between the meeting tongue and groove surfaces of the extrusions as the floor is assembled. By reason of the span of the extrusions between the spaced bolsters, there is normally a tendency for the extrustions to deflect under load between the supporting bolsters, causing a slight relative creep between the meeting joint surfaces which disturbs the mastic and reduces the sealing efficiency of the joint. In the improved structure the configuration of the extrusions produces a beam-like structure which is capable of withstanding with minimum deflection the load imposed upon the floor between the bolsters. To reduce this working still further, the tongue and groove configuration between the adjoining extrusions is designed to form a box-like section which is stiffened by the application of screws in the portions spanning the bolsters. The screws tie the adjoining tongue and groove sections to one another and clamp the meeting joint faces securely together to preserve the seal. The structure produces in effect a beam having exceptional stiffness and the absence of relative creep between the meeting faces preserves the sealing effect of the mastic almost indefinitely.

The extrusions are applied preferably with the corrugations extending longitudinally of the body and the endwise portions of the body are provided with troughs for draining the water which flows through the channels to the ends of the body. In applying the extrusions, the holes for the mounting screws are drilled as the extrusions are fitted and placed in position, holes being drilled in registry with the bolsters for the application of screws and additional holes being drilled between the bolsters for the above noted intermediate stiffening screws. In order to facilitate the drilling operation, the upper surface of certain floor corrugations which require fastening screws, are provided with shallow V-shaped grooves extending longitudinally along the corrugations and serving to center the drill point and guide the drill in its passage through the metal sections. The screws thus are aligned accurately in parallelism with the corrugations and the heads of the screws occupy a position above the plane of the drain grooves where they are exposed to the least amount of water. Leakage at the screw heads is prevented by the application of mastic beneath the screw-heads which is tightly compressed by the head when the screws are tightened.

Further details and advantages of the structure will be more fully apparent to those skilled in the art from the following description in connection with the drawings which disclose a preferred embodiment of the invention.

In the drawings:

Figure 3 is a fragmentary cross sectional view taken on line 3—3, Figure 1, illustrating the application of the flooring at one of the cross bolsters and showing also the base section which establishes a water-proof connection between the flooring and wall.

Figure 1:
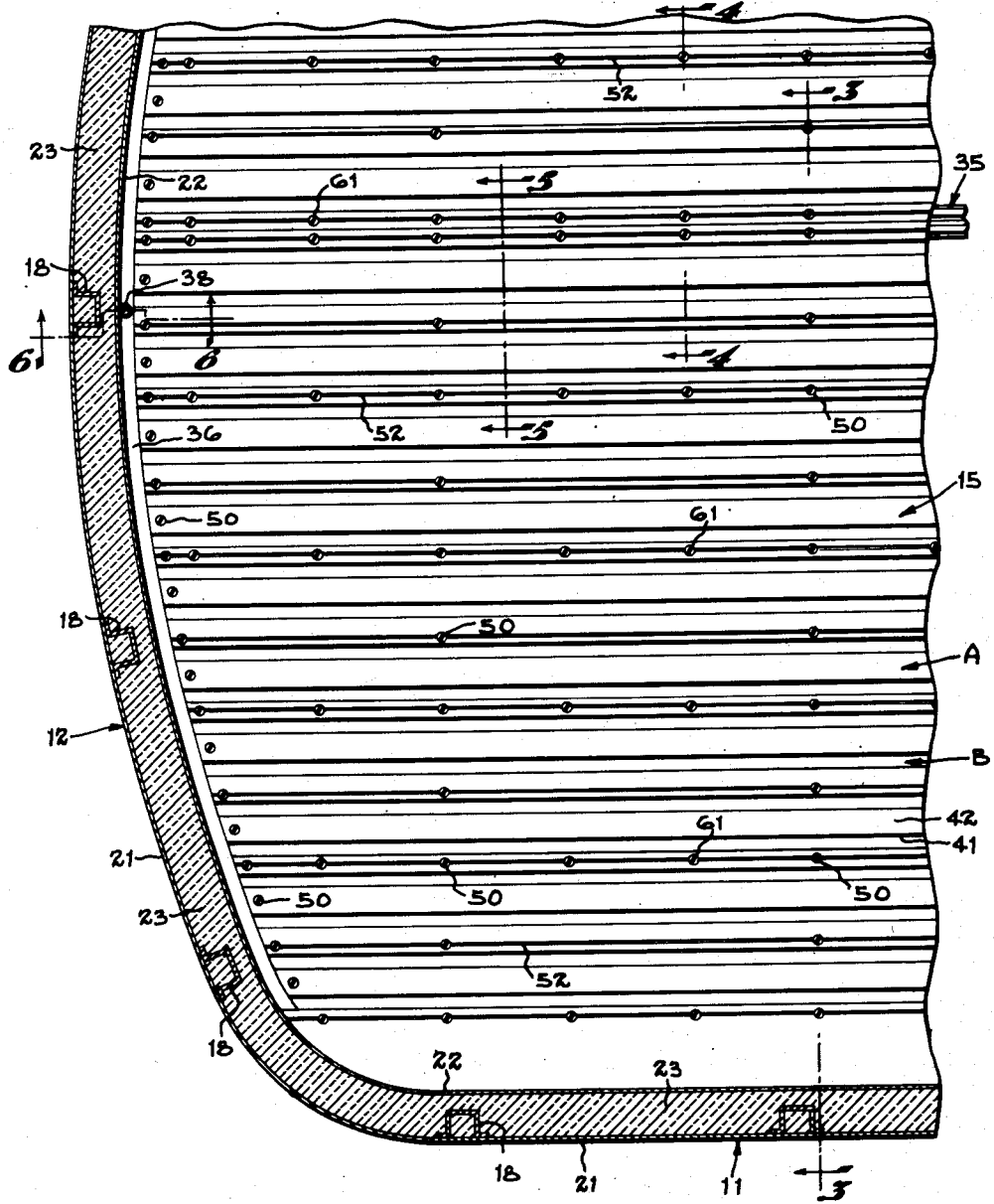
Figure 1 is a fragmentary sectional view taken on a horizontal plane, illustrating the installation of the extruded floor structure at the forward end of a trailer.

Figure 4 is a cross sectional view taken on line 4—4, Figure 1, illustrating the arrangement of the floor sections at the opposite side of the body showing the application of the reversing section at the center for reversing the position of the tongue and groove extrusion edges so as to provide a tongue adapted to mate with the base section at the wall of the body; in order to illustrate the attachment of the extrusions to one another to rigidify the span across the bolsters, the cross section is taken between the bolsters.

Figure 5 is an enlarged fragmentary sectional view taken on line 5—5, Figure 1, detailing the interlocking tongue and groove portions of the extrusions and further detailing the reversing or the key section for reversing the edgewise relationship of the extrusions at the center of the installation.

Figure 6 is an enlarged fragmentary cross sectional view taken on line 6—6, Figure 1, detailing the floor structure and its drainage trough at the forward end of the trailer.

Figure 2:
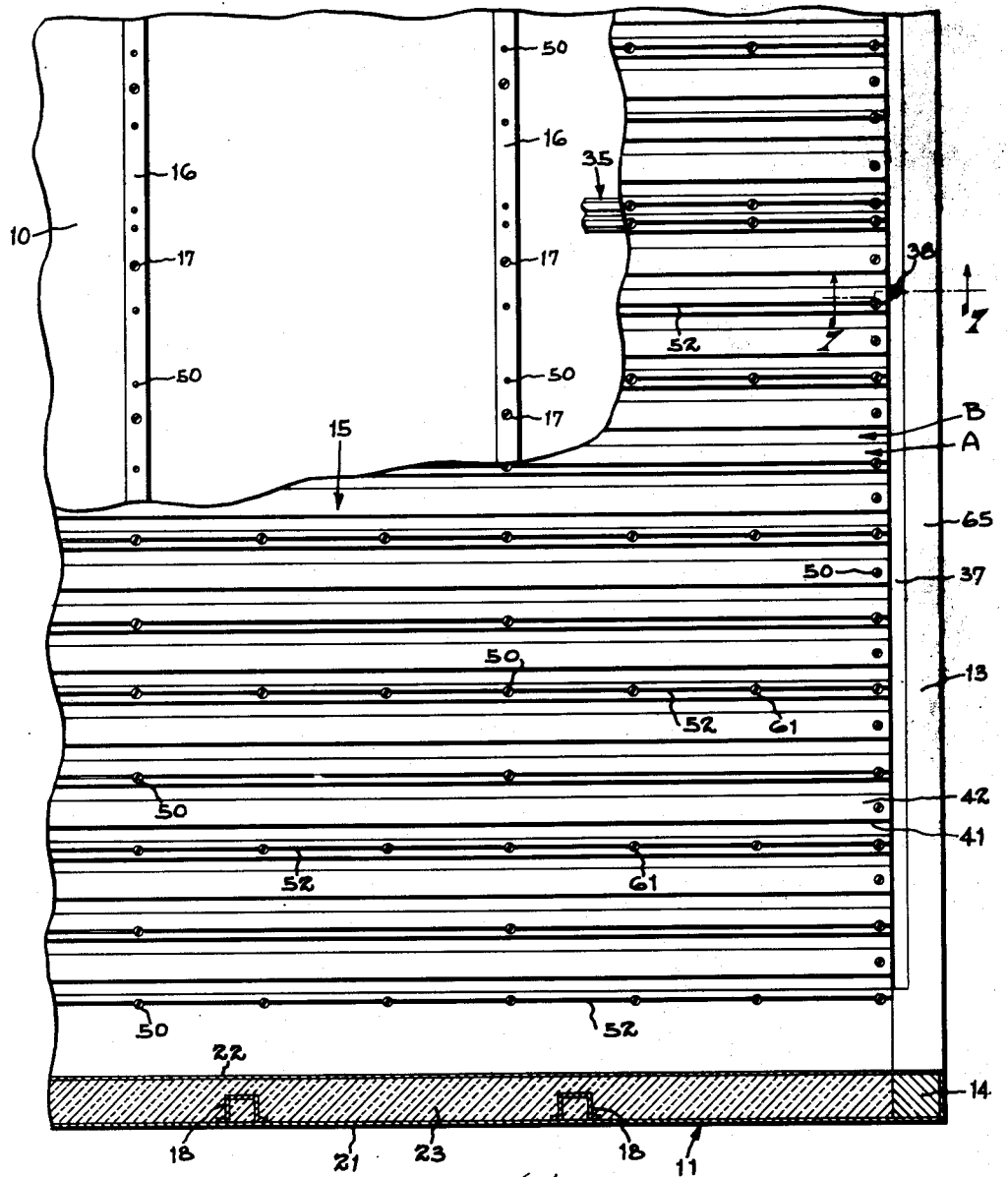
Figure 2 is a fragmentary sectional view similar to Figure 1, illustrating the floor structure at the rearward portion of the trailer.

Figure 7 is a sectional view taken on line 7—7, Figure 2, similar to Figure 6 detailing the trough structure at the rearward end of the trailer.

As disclosed in the drawings, the trailer body for which the extruded floor sections are primarily intended consists of an insulated refrigerator body having a frame consisting of longitudinal channels (not shown) joined by a series of cross members 10 (Figures 2 and 3) which support the floor structure. In the case of a semi-trailer, the vehicle includes the usual road wheels at the rearward end and the fifth wheel structure at the forward end adapted to establish a draft connection with the mating fifth wheel of a tractor. The fifth wheel includes a king pin and coupling jaws adapted to establish coupled engagement with the pin, the parts being arranged to couple automatically when the tractor is backed into coupling engagement with the trailer. The structural details of the trailer are omitted from this disclosure, since they are not relevant to the present invention.

As shown in Figures 1 and 2, the trailer body is provided with insulated side walls indicated generally at 11 joined by a front wall 12, while the rearward end of the body is provided with a door opening 13 for loading and unloading. The opening is provided with the usual doors (not shown) which are hinged upon the corner posts 14 at the rearward ends of the walls 11. The floor structure which is assembled from extruded sections indicated generally at 15, is supported upon cross bolsters 16 formed preferably of wood resting upon the cross members 10 and secured by screws 17, as shown in Figure 3. The side walls 11 are stiffened by means of vertical channels 18 rising from the cross members 10, the lower ends of channels 18 being anchored upon T-shaped structural members 20 following the usual practice (Figures 2 and 3). The side walls 11 include an outside skin 21 and an inside skin 22 formed of sheet metal such as aluminum, the space between the sheets being filled with insulating material 23, such as mineral wool or its equivalent. The space between the floor and the cross members 10 likewise is packed with insulating material 23, there being provided a floor pan 24 also formed of sheet aluminum which rests upon the upper surface of the cross members 10 to support the material from beneath.

The marginal edges of the floor pan 24 are anchored upon the T-shaped member 20 by means of screws 25 passing through molding strips 26 placed upon the upper surface of the floor pan and clamping its edge upon the member 20. The wooden cross bolsters 16 are placed upon the upper surface of the floor pan and are secured by means of the screws 17 passing through the bolsters and floor pan into screwthreaded engagement with the structural steel cross members 10. The inner metal skin 22 is spaced from the vertical channels 18 by means of horizontal furring strips 28 which are secured to the channel members 18 by screws 30. The sheet itself is secured to the strips by means of the wood screws 31 passing into the furring strips.

The floor structure 15 is connected to the side wall by means of the base section 32 which constitutes an angular extrusion formed preferably of aluminum having its upper edge underlying the inner sheet 22 and secured to the furring strips by the screws 31. The extrusion 32 includes a horizontal abutment flange 33 at its upper edge which supports the lower edge of sheet 22, as shown in Figures 3 and 4. It will be noted in these views that a duplicate base section 32 is utilized for both side walls of the trailer and that the inner edge of the angle sections both are provided with a groove which underlies the adjoining tongue edge of the floor sections. The abutment flanges space the cargo from the side walls and thereby maintain air circulation between the walls and cargo. Since the respective base sections 32 at opposite sides of the body overlie the grooved edge of the end extrusions, it is necessary to reverse the tongue and groove relationship of the extrusions with respect to one another in order to provide a tongue at both sides to mate with the base sections. For this purpose, there is provided an adaptor or reversing extrusion 35 (Figure 5) which is generally in the form of a T providing a double tongue which is adapted to receive two contiguous groove edges. The adaptor is installed at or near the center of the floor. Thus, the floor extrusions at the left side of the adaptor, as shown in Figure 3, have their tongue edges to the left to mate with the base extrusion 32 at the left side and the sections to the right of the adaptor have their tongue sections to the right to mate with base extrusion on the right side, as shown in Figure 4. By this arrangement, the floor extrusions and the base extrusions are duplicates adapted for left and right hand installation by interposing the adaptor extrusion 35.

The floor structure constituted by the assembled sections 15 provides a supporting surface indicated at A having a series of longitudinal grooves B which are somewhat narrower than the supporting surface. The grooves allow air to circulate under the cargo which is resting upon the supporting surfaces and they serve also to drain off water from the melting ice. As shown in Figures 6 and 7, the water is drained from the grooves into troughs 36 and 37 respectively at the forward and rearward ends of the trailer, the troughs being provided with nipples 38 for discharging the water. The ends of the extrusions are supported and closed off by means of blocks 40 preferably of wood (Figures 6 and 7) which are placed in the corrugations of the supporting sections A with the blocks resting upon the cross bolster 16 and secured by flat head wood screws.

Described in detail, each extruded floor section 15 is in the form of a corrugated section having a relatively thin wall thickness, the corrugations being square in cross section so as to provide vertical walls 41 supporting the horizontal floor surfaces 42. The floor surfaces 42 collectively form the cargo supporting surface A and are proportionately wider than the lower connecting sections 43 of the grooves B. Since the wall sections 41 are vertical, the load is carried in compression and the relative lightweight structure is thus able to withstand heavy loads without danger of failure. As shown in Figure 3, the left hand edge of the first floor extrusion which interlocks with the base section 32 is provided with a tongue 44 and the right hand edge of this section constitutes a groove 45 adapted to overlie and interlock the tongue of the next adjoining section. Beneath the tongue 44, the extrusion includes a flange 46 which interlocks with rib 47 formed at the lower wall portion beneath groove 45. The edge of the base section 32 which overlies tongue 44 is a duplicate of the groove 45 of the floor extrusion and is provided with a vertical wall 41a similar to the vertical walls 41. This wall near its lower edges is provided with a rib 47a interlocking with the flange 46 of the floor extrusion. The above described structure is more clearly disclosed in Figure 5 on an enlarged scale and it will be observed that the tongues and the cooperating grooves are tapered in cross section to provide a wedging engagement with one another.

As shown generally in Figures 1 and 2 and detailed in Figure 3, the floor extrusions are secured to the wooden cross bolsters 16 by means of flat head wood screws 50 which pass through the floor surfaces 42 and the lower flange 46 of each extrusion at the joints and into screw-threaded engagement with the cross bolster. In order to provide additional support, the intermediate corrugation of each extrusion is provided with an inwardly extended flange 51 with a screw 50 passing into the bolster. In installing the sections, holes for the screws 50 are drilled as the sections are installed and in order to center the drill longitudinally of the extrusions, there is provided a longitudinal shallow groove in those corrugations which are to be drilled, as indicated at 52 in Figures 1, 2 and 5. These grooves are V-shaped in cross section and center the tip of the drill accurately with respect to the corrugations and thus facilitate the work and preserve accuracy.

The upper surface of each tongue is provided with a series of similar grooves 53 which are designed to prevent displacement of the mastic water-proof compound placed between the meeting faces of the tongue and groove joints to seal out water. This material which is indicated at 54, in plastic condition is placed upon the upper surface of the tongue at assembly and is squeezed firmly between the meeting surfaces to prevent leakage of water into the insulating material 23 which is placed between the floor and floor pan. The water-proofing compound also is placed between the meeting surfaces at the base section 32 and the reversing section 35. By virtue of the inclined wedging engagement between the tongue and groove sections upon being drawn together, a rigid mechanical connection is established between the interlocking parts which aids in forming the water-proof joint.

The reversing section 35 is installed approximately at the longitudinal center of the body, as indicated in Figures 1 and 2, and as detailed in Figure 5, it constitutes a base 55, a vertical wall 56 and a pair of duplicate tongue sections 57—57. These sections, as above noted, are duplicates of the tongues 44 for the extruded floor sections 15 and provide an interlocking engagement with the adjoining grooves 45 of adjoining floor extrusions. Between the tongues 57—57, there is provided a V-shaped groove 58 to receive the tapered flanges 60 of adjoining grooves. The ribs 47 of the floor extrusions overlie the edges of the base 55 to provide an interlock similar to that between the floor extrusions. The wood screws 50 at the cross bolsters clamp the floor extrusions securely upon the tongues 57—57 and the adjoining edges of the extrusions are wedged toward each other by the V-shaped channel 58 so as to secure the extrusions firmly and provide an effective water-proof joint between them.

In a sectional floor which is supported by spaced cross members, a slight amount of relative movement is apt to occur between the interlocked tongue and grooves spanning the cross bolsters due to deflection of the floor under the load imposed upon it. In a road vehicle, sustained deflection takes place while the vehicle is in motion, also the deflections are increased by shocks. Such movement disturbs the sealing compound and, if continued for a prolonged period, damages the water-proof joint causing leakage of water into the insulating material. This interferes seriously with the insulating qualities of the material and also causes deterioration of the structural members. To prevent this action in the present arrangement, the extruded sections are stiffened between the bolsters by the application of screws 61, as illustrated in Figures 1, 2 and 4. Screws 61 consist of flat head machine screws passing through the floor surfaces 42 into screwthreaded engagement with the lower flanges 46 at the joints, the screws being applied also to the joint established by the reversing section 35. As disclosed in Figures 1 and 2, two cross rows of screws are installed between each cross bolster although it will be apparent that the number of rows may be varied in accordance with the spacing of the bolsters. The effect of these screws is to clamp the adjoining extrusions firmly together against longitudinal creep and by virtue of the box section of the assembled extrusions at the tongue and groove joints, a beam is produced which is extremely rigid and highly resistant to deflection. The addition of screws 61 prevents working of the water-proofing and thereby prolongs the seal almost indefinitely in addition to producing an exceptionally rigid floor.

The forward and rearward ends of the extrusions are supported and blocked off to prevent water from reaching the insulating material by means of the blocks 40, which are preferably of wood, previously noted. These blocks rest upon a wooden cross bolster 16 which is supported by angle members 62 forming a part of the trailer frame, the edge of floor pan 24 being clamped between the bolster and angle member. The wall section is supported by the T-shaped structural member 20 similar to that provided along the side walls of the vehicle. The inner skin plate 22 is extended downwardly below the top surface of the endwise cross bolster 16 to form the drainage trough 36 and the edge of the plate 22 is clamped as at 63 between bolster 16 and the blocks 40. The assembly is held in clamped relationship by the wood screws 50, as previously described. The end construction is the same for both ends of the vehicle, as shown in Figures 6 and 7, except that the door opening 13 includes an inclined sill 65 terminating in the trough 37. The position of the rear door 66 with respect to the sill is indicated by the broken lines in Figure 7.

Having described my invention, I claim:

1. A floor structure adapted to provide a series of channels for air circulation and drainage comprising, a plurality of elongated floor sections of corrugated cross section providing alternate longitudinal support surfaces and drainage channels, each of the floor sections having opposite marginal flanges constructed and arranged to overlap the marginal flange of an adjacent floor section substantially in the plane of the support surfaces when the sections are assembled in contiguous relationship, each of the floor sections having a base flange and cooperating locking means along opposite longitudinal edges parallel with and spaced downwardly from the marginal flanges, said base flange being adapted to be engaged by said locking means when the sections are assembled in contiguous relationship and provide a hollow box section, and means adapted to clamp the hollow box section in assembled relationship.

2. In a water-proof floor structure for a vehicle adapted to provide a series of channels for air circulation and water drainage, a plurality of elongated metal sections of corrugated cross section providing alternate longitudinal cargo support surfaces and drainage channels, each of the sections having a tongue extending along one longitudinal edge and being configurated along its opposite edge to provide a groove adapted to overlie and interlock with the tongue of an adjoining section when the sections are assembled in contiguous relationship upon the vehicle floor, each of the sections having a base flange along one longitudinal edge parallel with and spaced downwardly from said tongue and in the plane of said drainage channels, said base flange being adapted to be engaged by the edge of an adjoining section when the sections are assembled in contiguous relationship to form a hollow box section in conjunction with the interlocked tongue and groove, the said tongue having a horizontal top surface of substantial width joined by tapered side walls and the groove having a mating surface corresponding to the top and side walls of the tongue to provide a sealing interface, the tongue extending upwardly to dispose its horizontal top surface substantially in the plane of the support surface to locate the sealing interface above the channels in a position isolated from water draining therethrough.

3. In a refrigerator vehicle having a floor frame including a series of cross bolsters disposed in spaced relationship with respect to one another, a metal floor structure adapted to be installed upon the bolsters to support the cargo comprising, a plurality of elongated metal floor extrusions adapted to be installed longitudinally with respect to the said cross bolsters, the extrusions being corrugated in cross section to provide alternate cargo support surfaces and drainage channels, each of the extrusions having along one edge a vertical wall including a horizontal top flange extending outwardly from its upper edge to provide a tongue and the opposite edge of the extrusion having a vertical wall including a flange extending from its upper edge outwardly in an opposite direction configurated to provide a groove section adapted to overlie and interlock with the tongue of an adjacent extrusion when the extrusions are installed in contiguous relationship upon the cross bolsters, each extrusion including a base flange parallel with and spaced downwardly from the top flange of the tongue to form a hollow box section in conjunction with the interlocked groove section, and clamping means extending through the tongue and groove sections and in engagement with the base flange to clamp the interlocked tongue and groove sections together and thereby provide a unitary box section spanning the bolsters to reenforce the floor structure.

4. In a refrigerator vehicle having a floor frame including a series of cross bolsters disposed in spaced relationship with respect to one another, a metal floor structure adapted to be installed upon the bolsters to support the cargo comprising, a plurality of elongated metal floor extrusions adapted to be installed longitudinally with respect to the said cross bolsters, each of the said extrusions being corrugated in cross section to provide alternate cargo support surfaces and drainage channels, each of the extrusions having along one edge a hollow tongue and the opposite edge of the extrusion having a flange extending from its upper edge outwardly in an opposite direction configurated to provide a groove section adapted to overlie and interlock with the tongue of an adjacent extrusion, the said tongue including a base flange spaced downwardly from its upper surface to form a hollow box section in conjunction with the interlocked groove section, the said groove section having a rib adapted to overlie the edge of said base flange and interlock therewith, and a plurality of screws extending through the tongue and groove sections and in threaded engagement with the base flange to clamp the interlocked tongue and groove sections in pressure engagement with one another.

5. In a water-proof floor structure adapted to be installed upon the cross bolsters of a refrigerator vehicle, a plurality of elongated metal floor sections of corrugated cross section providing alternate inverted longitudinal cargo support channels and open drainage channels, each of the sections having along one edge a tongue and along the opposite edge having a horizontal flange configurated in cross section to provide a groove adapted to establish a seal with the tongue of an adjoining section, the said floor sections being mounted with their drainage channels resting upon the cross bolsters, and attachment screws passing through the horizontal flange and tongue into screwthreaded engagement with the bolsters to clamp the same in sealing engagement with one another upon the cross bolsters, the inverted cargo support channel having a base flange along one side thereof adapted to rest upon the cross bolster with an attachment screw passing through the upper surface of the channel and flange into the cross bolster, the upper surface of the channel having a longitudinal groove aligned with the said flange and adapted to center a drill with respect to the flange for installing the attachment screws.

6. In a water-proof floor structure adapted to be installed upon a series of cross members of an insulated refrigerator vehicle, a plurality of elongated metal floor sections of corrugated cross section providing alternate longitudinal inverted cargo support channels and open drainage channels, each of the sections having along one edge a tongue and along the opposite edge having a horizontal flange configurated in cross section to provide a groove adapted to overlie and establish a seal with the tongue of an adjoining section, a floor pan mounted upon the said cross members of the frame, respective cross bolsters mounted upon the cross members above the floor pan, the said floor sections being mounted with their drainage channels resting upon the cross bolsters in spaced relation to the floor pan, insulating material packed in the space between the floor sections and floor pan to insulate the floor structure, respective cross bolsters disposed at the ends of the floor structure to support and enclose the same, and closure blocks disposed within the ends of the inverted cargo support channels to support and enclose the same.

7. A water-proof floor structure adapted to be installed upon the cross bolsters of a refrigerator vehicle to provide a series of channels for air circulation and water drainage comprising, a plurality of elongated metal floor sections of corrugated cross section providing vertically disposed walls adapted to provide a bearing support for the cargo, the upper and lower edges of the vertical walls being joined by alternate upper and lower horizontal walls providing alternate inverted cargo support channels and open drainage channels, each of the floor sections having opposite marginal flanges adapted to overlap one another when the floor sections are assembled in contiguous relationship upon the cross bolsters and forming a sealing interface substantially in the plane of the said upper horizontal walls, means adapted to clamp the overlapped marginal flanges in sealing engagement with one another upon the cross bolsters, and means adapted to clamp the overlapped flanges in sealing engagement with one another between the cross bolsters to resist relative movement therebetween and preserve the sealing relationship of the said interface.

8. A water-proof floor structure for refrigerator vehicles adapted to provide a series of channels for air circulation and water drainage comprising, a plurality of elongated metal floor sections of corrugated cross section providing vertically disposed walls adapted to provide a bearing support for the cargo, the upper and lower edges of the vertical walls being joined by alternate upper and lower horizontal walls providing inverted cargo support channels and open drainage channels, each of the floor sections having opposite marginal flanges adapted to overlap one another when the floor sections are assembled in contiguous relationship and forming a sealing interface substantially in the plane of the said upper horizontal walls, means adapted to clamp the overlapped marginal flanges in sealing engagement with respect to one another, a drainage trough extending at right angles to the said open channels at an end thereof adapted to receive the drainage from the channels, and respective closure blocks disposed in the ends of the inverted cargo support channels to support the same and provide a seal.

9. A water-proof floor structure for vehicles adapted to provide a series of channels for air circulation and water drainage and arranged to establish a water-proof connection with the side walls of the vehicle comprising, a plurality of elongated metal floor sections of corrugated cross section providing alternate cargo support surfaces and drainage channels, each of the sections having a tongue along one edge and a groove flange along the opposite edge arranged to overlap the tongue of an adjoining section when the sections are assembled in contiguous relationship, a base section having a substantially right angular cross section disposed along the side wall of the vehicle at the juncture of the floor and wall, the base section having a groove flange adapted to overlie the tongue of an adjoining floor section, a reversing section interposed longitudinally of the assembled vehicle floor, the reversing section having a duplicate pair of tongues adapted to mate with adjoining groove flanges of the floor sections, the floor sections being continued in reverse order from the reversing section to present a tongue to the opposite side wall, and a duplicate base section disposed along the side wall at the juncture of the side wall and floor having its groove flange overlapping the tongue of the floor section.

10. In a water-proof floor structure adapted to be installed upon the cross bolsters of a refrigerator vehicle and arranged to provide a series of channels for air circulation and water drainage, a plurality of elongated metal floor sections of corrugated cross section providing alternate cargo support surfaces and drainage channels, each of the sections having a tongue along one edge and a groove flange along the opposite edge arranged to overlap the marginal flange of an adjacent section, the said tongue having tapered side walls and the said groove flange having correspondingly tapered side walls adapted to mate with the tongue in wedging engagement, a reversing section interposed longitudinally of the assembled vehicle floor, the reversing section having a duplicate pair of tapered tongues adapted to mate with adjoining duplicate groove flanges of the floor sections, the said pair of tapered tongues being delineated by a substantially V-shaped groove adapted to receive in wedging engagement the tapered side walls of the groove flanges to draw the same laterally toward one another and having a base flange beneath the pair of tapered tongues adapted to receive in screwthreaded engagement a pair of clamping screws passing through the groove flanges and tongues.

JAMES J. BLACK.

REFERENCES CITED

The following references are of record in the file of this patent:

UNITED STATES PATENTS

| Number | Name | Date |
| --- | --- | --- |
| 697,949 | Schofield | Apr. 15, 1902 |
| 1,806,428 | Travis, Jr. | May 19, 1931 |
| 1,913,342 | Schaffert | June 6, 1933 |
| 2,380,861 | Meyer et al. | July 31, 1945 |
| 2,424,410 | Miles | July 22, 1947 |
| 2,478,993 | Wing | Aug. 16, 1949 |